No. 828,393. PATENTED AUG. 14, 1906.
H. EMERSON.
MIRROR FOR BRUSHES OR THE LIKE.
APPLICATION FILED SEPT. 16, 1905.

Witnesses

Inventor
H. Emerson.
By
Attorneys

UNITED STATES PATENT OFFICE.

HOMER EMERSON, OF MILTON, MASSACHUSETTS.

MIRROR FOR BRUSHES OR THE LIKE.

No. 828,393.          Specification of Letters Patent.          Patented Aug. 14, 1906.

Application filed September 16, 1905. Serial No. 278,766.

*To all whom it may concern:*

Be it known that I, HOMER EMERSON, a citizen of the United States, residing at Milton, in the county of Suffolk and State of Massachusetts, have invented certain new and useful Improvements in Mirrors for Brushes or the Like, of which the following is a specification.

The object of this invention is to provide a new article consisting of a tooth-brush having a mirror applied thereto.

The advantages of a mirror attachment for tooth-brushes are obvious, a brush of this class being often used in places where mirrors are not accessible and the condition of the teeth not ascertainable, the above often preventing a thorough cleansing of the same.

In the practical adaptation of the invention the general form of the tooth-brush is the same as those at present most commonly in use, the handle thereof, however, being so constructed as to readily admit of attaching a small mirror thereto in a position convenient for use, but not interfering in any way with the manipulation of the brush in the use thereof.

For a full description of the invention and the merits thereof and also to acquire a knowledge of the details of construction of the means for effecting the result reference is to be had to the following description and accompanying drawings, in which—

Figure 1:
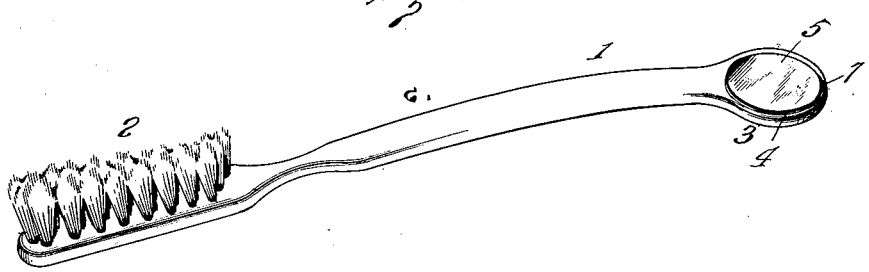
Figure 2:
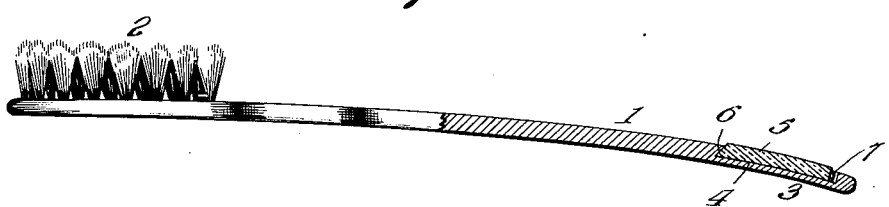

Figure 1 is a perspective view of a brush, showing the invention applied thereto. Fig. 2 is a vertical longitudinal sectional view.

Corresponding and like parts are referred to in the following description and indicated in both the views of the drawings by the same reference characters.

In the drawings the numeral 1 designates the shank or handle of a tooth-brush of common type, the brush or bristles 2 thereof being arranged at one end of the handle 1. The opposite end of the handle is transversely widened or enlarged to form a supporting member (shown at 3) and is formed with a recess 4, in which is disposed the mirror 5. The mirror 5 may be of circular or other form, and the form of the recess 4 will of course correspond thereto, so that the mirror may snugly fit in the recess and not detract from the appearance of the brush nor interfere with the manipulation of the article. It is to be understood that the mirror may be secured in the recess 4 in any suitable way, being preferably substantially attached thereto by fastening means of any desired form.

Under some conditions it may be desirable that the mirror 5 be displaceable from the handle, and in this event the recess 4 may be formed at one side thereof with an undercut portion 6 to slightly overlap the edge of the mirror, and at the diametrically opposite side of the recess is located a small flat spring 7, the ends of which may be seated and secured to the side of the recess at which said spring is disposed. The spring 7 is adapted to frictionally engage an edge portion of the mirror at a point opposite to the edge portion overlapped by the undercut portion 6 of the recess, and the actuation of the spring will be sufficient to hold the mirror in place without likelihood of accidental displacement thereof. The mirror, however, can be readily removed for purposes of cleansing or the like.

Having thus described the invention, what is claimed as new is—

In a device of the class described, the combination of a supporting member provided with a recess therein, a mirror snugly fitting in said recess, a side of the recess being undercut so as to overlap the edge portion of the mirror, and a flat spring secured in the recess and bearing against an edge portion of the mirror to hold it in engagement with the undercut portion of the recess and prevent displacement thereof.

In testimony whereof I affix my signature in presence of two witnesses.

HOMER EMERSON. [L. S.]

Witnesses:
PAULINE B. KLEIN,
VERE GOLDTHWAITE